Patented Nov. 21, 1922.

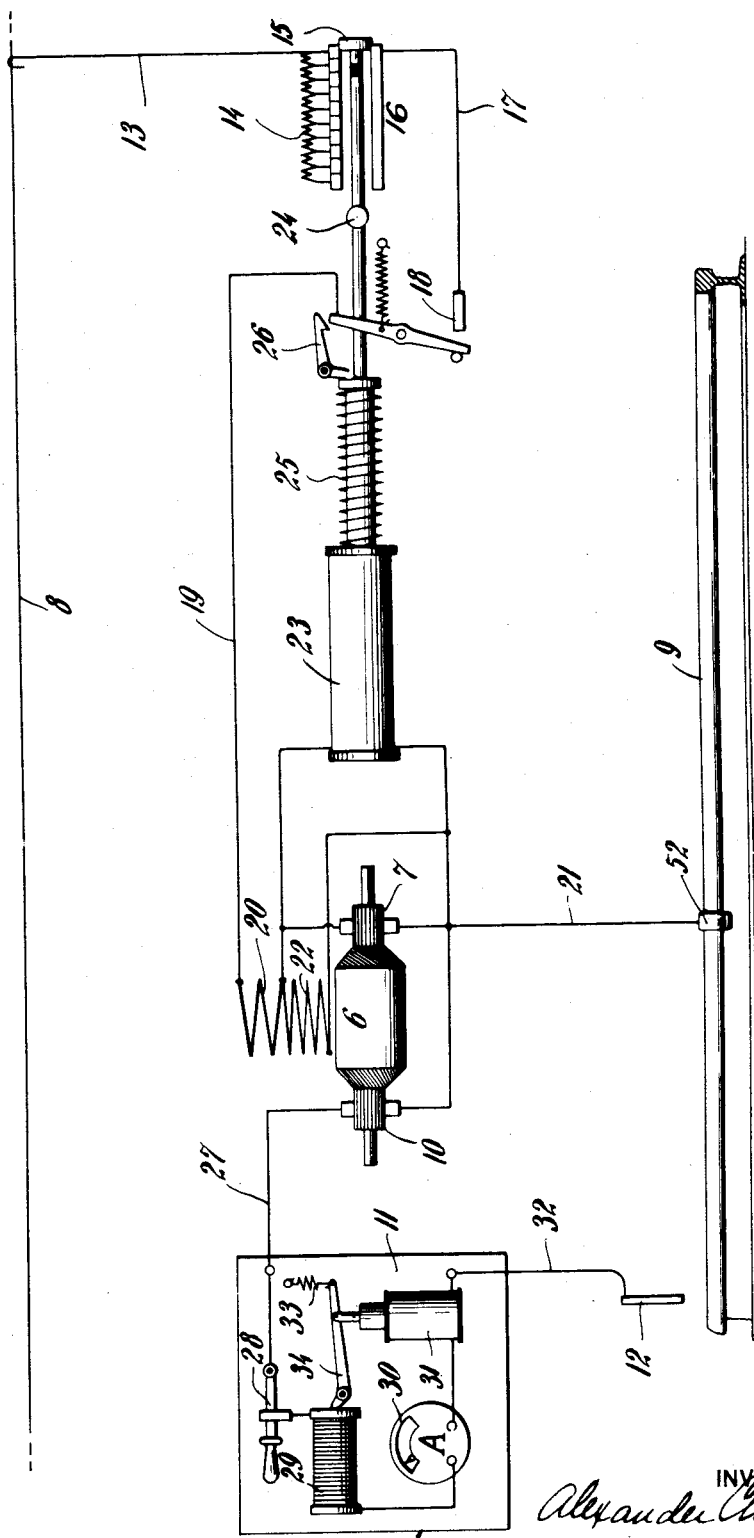

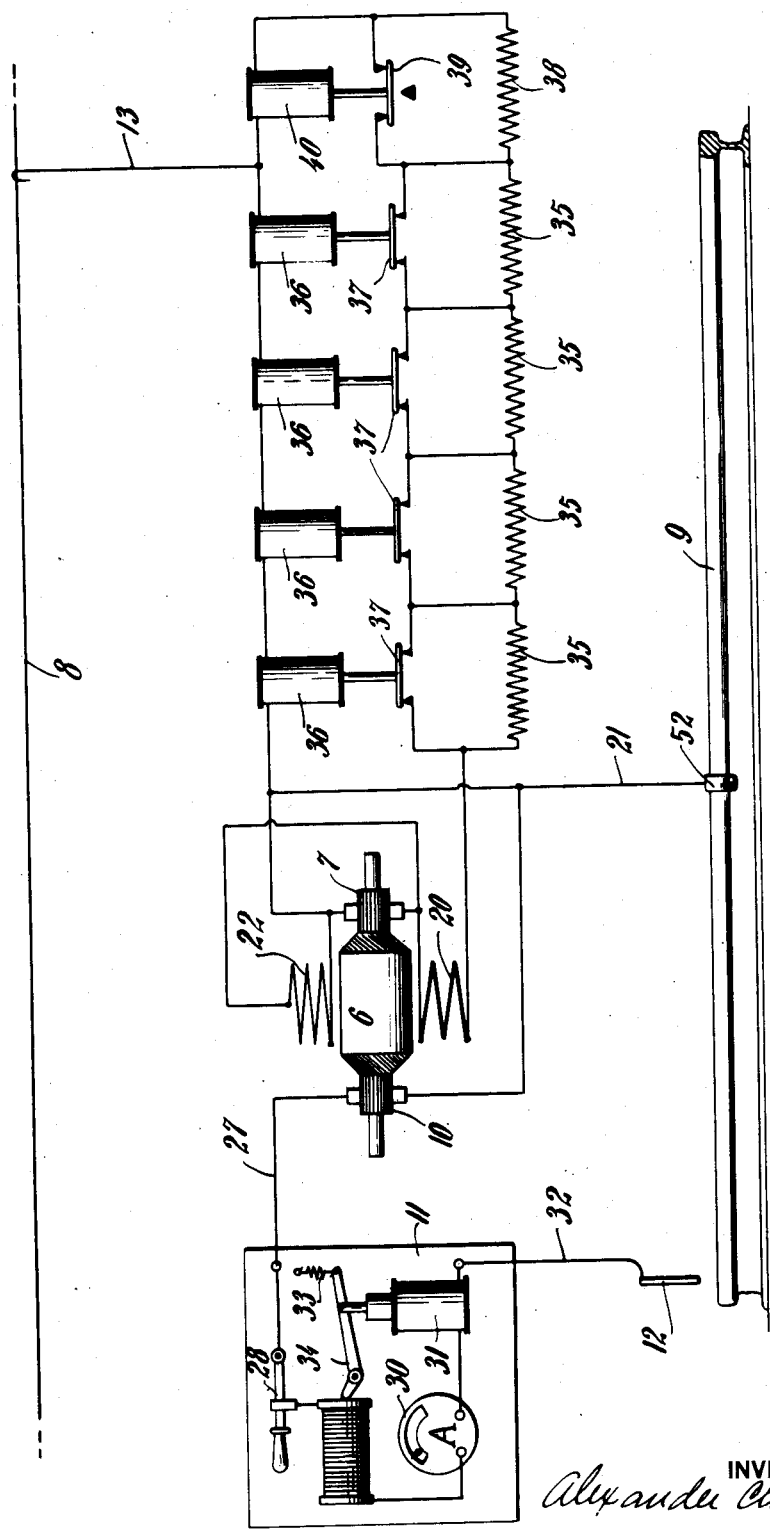

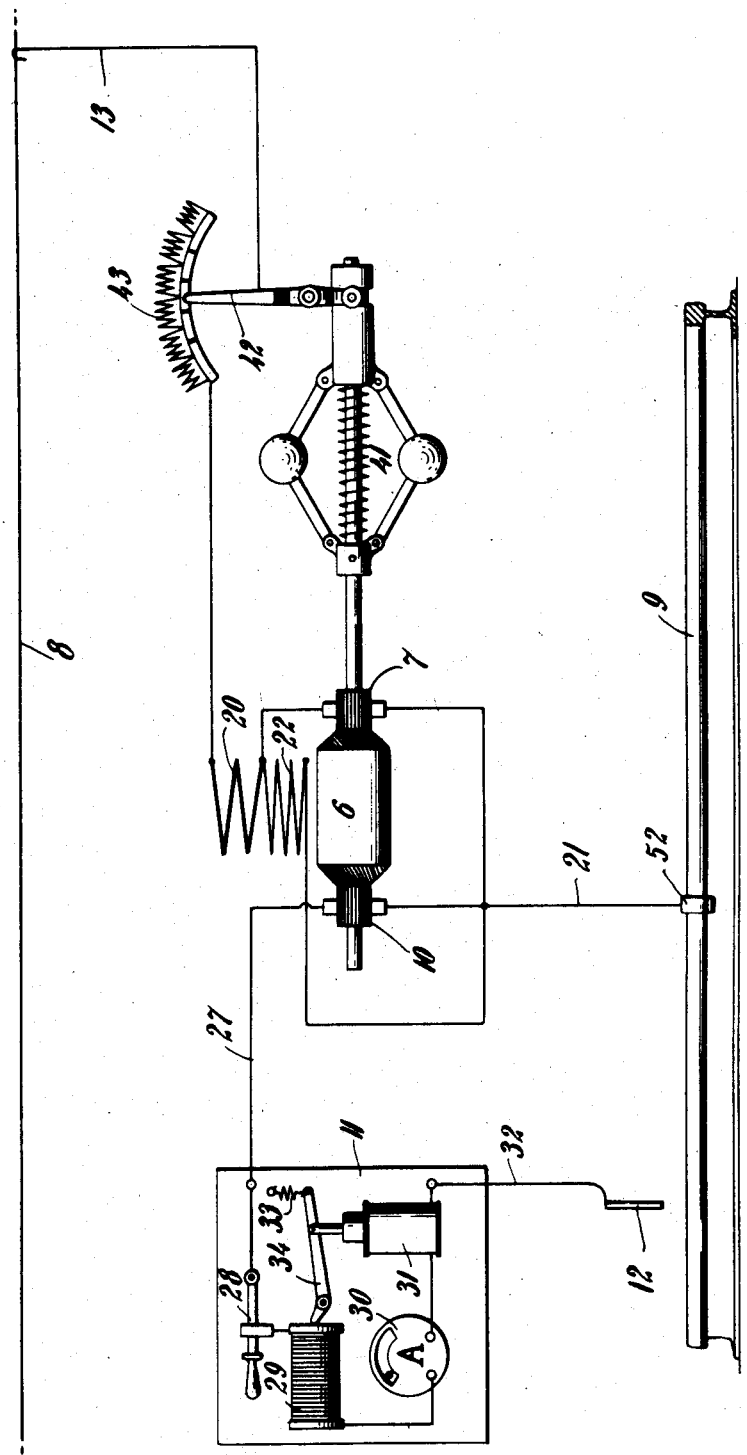

1,435,914

UNITED STATES PATENT OFFICE.

ALEXANDER CHURCHWARD, OF NEW YORK, N. Y., ASSIGNOR TO WILSON WELDER & METALS COMPANY, INC., A CORPORATION OF NEW YORK.

ELECTRICAL WELDING APPARATUS.

Application filed March 19, 1919. Serial No. 283,573.

*To all whom it may concern:*

Be it known that I, ALEXANDER CHURCHWARD, a citizen of the United States, residing at New York city, county of New York, State of New York, have invented a certain new and useful Improvement in Electrical Welding Apparatus, of which the following is a specification.

This invention relates to an electrical welding apparatus, and particularly to arc-welding; and one important adaptation consists in the practice of the invention in the welding of track bonds for electric railways, three examples of which are illustrated in the accompanying drawings and particularly described hereinafter.

One object of the invention is to translate the energy of a variable-potential source of electric current, into such a nearly constant-potential current supply as will efficiently meet the requirements of arc welding. When a portable rail-bonding plant is employed on a track, it can most conveniently derive its power from the trolley wire or third-rail of the traction power system, which, however, is generally subject to very wide voltage variations; and it is in converting this traction-circuit energy into arc-welding current, that my invention finds one of its most useful applications.

In the accompanying drawings, Figures 1, 2 and 3, show different means of practicing the invention in arc-welding the rail-bonds of an electric railway.

In the system of Figure 1, the dynamotor 6 derives energy through its motor commutator 7 from the potential difference between the trolley wire 8 and track rail 9; and delivers welding current through its generator commutator 10 to the controlling board 11 generally known as the "welding panel", and thence to the arc-welding electrode 12.

The entire outfit may be mounted on a suitable truck, or otherwise conveyed along the railway, and may be connected to the trolley wire or third-rail by a temporary contact, such as the hooked wire 13 in this instance hung over the trolley wire.

From the power-line contact 13, the motor-circuit leads through the rheostat 14, wiper block 15, contact bar 16, wire 17, automatic switch 18, wire 19, dynamotor series-field coil 20, and dynamotor commutator 7 and its motor windings, to the wire 21 grounded on the track rail, through a suitable spring clamp 52. The dynamotor shunt field coil 22, and the resistance-controlling solenoid 23, are both connected directly in shunt with the motor winding of the armature.

In starting the dynamotor, the handle 24 on the bar or stem extending from the solenoid core, is grasped and pushed inward against the effort of the spring 25 surrounding the core, this movement being continued until the core has entered the solenoid and the handle has engaged the lever of the switch 18 to close the switch and lock it under the dog 26. This movement slides the wiper 15 to its inmost position, introducing all sections of the rheostat 14 into the motor circuit before it is finally closed. The solenoid core and its stem will be held in this position while the dynamotor speeds up and until its motor counter E. M. F. has effected due energization of its shunt field-coil 22 and the resistance-controlling solenoid 23 also in shunt with the motor winding. Thereafter the handle 24 will be released, and the solenoid, with suitable dash-pot retardation, will tend to emerge from the solenoid under the effort of the spring, and gradually cut out the resistance 14 to increase the motor speed and counter E. M. F., and the solenoid current, until the spring effort and solenoid pull become balanced at a point determined by the motor counter E. M. F. which is in turn dependent on the voltage received from the traction line through those sections of the rheostat 14 remaining in series with the motor.

Of course, as the traction line voltage increases, the dynamotor will tend to speed up and increase its motor counter E. M. F. and the current in its shunt-connected solenoid so as to further attract the solenoid core and thus introduce more resistance into the circuit to absorb the said increase in the traction line voltage and thereby protect the armature from over-voltage and over-speeding. And, oppositely, as the traction line voltage decreases, the motor speed and counter E. M. F. tend to decrease in consequence, so as to reduce the solenoid current and cause a retraction of its core to gradually cut out the compensating resistance and thereby avoid undue slowing down of the dynamotor. Thus, when the apparatus is properly designed, it functionates to approximate a constant impressed E. M. F. on the motor windings, and a constant dynamotor speed.

When the secondary or dynamo circuit of the dynamotor is inactive or open, as when the welding current is not being used, the tendency of the dynamotor to race will merely increase the motor counter E. M. F. to a given maximum which will energize the solenoid to draw the wiper block 15 to its extreme inward position, thus inserting into the motor circuit the last section of the rheostat, which will be of sufficiently high resistance to limit the free speed of the motor to a small increase over its normal speed.

If the motor circuit is opened at the trolley-wire contact, or at the ground contact, or otherwise, then as the dynamotor slows down and the E. M. F. generated in its motor winding is reduced, the solenoid will gradually release its core, which will be retracted until its outer spring collar strikes the dog 26 to unlock the switch 18 which will be opened by its spring, as indicated. This device protects the dynamotor from sudden application of unduly high impressed potential when the opened contact is restored, since it then becomes necessary to restart the dynamotor by means of the starting handle 24, as at first explained.

Of course the drawing purports only to present a diagram illustrating the functional relation of the elements involved, which in practice, will be designed by technicians in accordance with the principles of the art and the mechanical skill of the designer.

The generator circuit of the dynamotor leads from the ground wire 21 through the commutator 10 and generator winding, and thence through the wire 27 to the welding panel wherein the circuit leads through the main switch 28, carbon pile rheostat 29, ammeter 30, and rheostat controlling-solenoid 31, and thence from the welding panel through the wire 32 to the welding electrode 12, and thence through the welding arc to the rail and the bond which is being welded.

The dynamo winding of the dynamotor delivers to the welding circuit a voltage as nearly constant as can be attained, and it is the function of the welding panel to further regulate the welding current to compensate the effects of variations in welding arc and maintain as nearly as possible, a constant welding current. The particular means embodied in the welding panel here shown, are no part of the present invention, though it may be remarked in passing, that the spring 33 compresses the resistance pile through the lever 34, thus tending to reduce the resistance in the welding circuit, while the solenoid 31 pulls against the spring, thus tending to introduce compensative resistance as the welding current rises in consequence of a reduction in the resistance of the welding arc, for instance when the welding electrode is brought too near the work.

In the adaptation shown in Figure 2, the sectional resistances 35 in series with the motor windings are successively cut in and out by the solenoids 36 connected in series directly between the trolley wire and the track rail, to be directly controlled by voltage variations in the traction power line. These solenoids and their cores are so designed, wound, weighted and adjusted that, with minimum traction line voltage, they will all drop their contact bars 37 to cut out all the resistances 35 from the motor circuit; and as this voltage increases to its maximum, the solenoids will successively raise their contact bars to introduce the compensative resistances to maintain an approximately constant impressed voltage on the motor windings. And oppositely, of course, as the traction line voltage drops, the solenoids will successively drop their contact bars in the reverse order, to successively cut out the compensative resistances. Thus, in this instance, the traction line voltage controls the compensative resistances more directly than in the practice of Figure 1, wherein the control is effected through intermediate effect on the motor counter E. M. F.

When the welding load on the dynamotor ceases, the consequent speed increase of its armature will be limited by an extra resistance 38 introduced by falling of the contact bar 39 in response to the consequent reduction of current in the extra solenoid 40 in series with the motor winding; and as the welding load is restored, the solenoid 40 will of course be again sufficiently excited to restore its contact bar and again cut out the extra resistance.

In the adaption of the invention shown in Figure 3, the variations of traction line voltage produce speed variations in the dynamotor which are self-limiting by their effects on the centrifuge 41 operating to swing the contact-wiper 42 in either direction to introduce or remove the successive sections of the compensative resistance 43. Hence, as the traction line voltage rises, the resulting increase in motor speed introduces compensative resistance to absorb the voltage increase, and vice versa.

When the welding load is discontinued, the resulting speed increase of the dynamotor armature will introduce the last section of the compensative resistance, which will be sufficiently high to properly limit the free speed of the machine.

In all the foregoing instances, the means for translating the electric traction power into a more nearly constant-potential source of welding current, co-operates with the automatic current-regulating means of the welding panel, to maintain a welding current approximating constancy as nearly as possible.

The broad inventive idea may of course be practiced in many other specific ways, some within the ordinary skill of technicians, and others attainable by supplemental invention, but all within the principles and purview of the invention and its following definitions.

I claim:

1. Electric welding apparatus comprising electrical energy-converting means, and means responsive to fluctuations of E. M. F. applied thereto to automatically limit the consequent variations of output E. M. F., a welding circuit arranged to receive the output current from the converting means, and automatic current-regulating means controlled by the welding current and responsive to its variations to limit their magnitude.

2. Electric welding apparatus comprising connected electro-motor and electro-generator means, and means responsive to variations of impressed motor E. M. F. to limit the speed of said connected motor-and-generator means, and electric welding means connected with the generator output circuit.

3. Electric welding apparatus comprising connected electro-motor and electro-generator means, and means responsive to variations of impresed motor E. M. F. to limit the speed of said connected motor-and-generator means, and electric welding means connected with the generator output circuit, and including automatic current-regulating means responsive to variations of welding current to limit the magnitude thereof.

4. Electric welding apparatus comprising connected electro-motor and electro-generator means, electric welding means connected with the generator output circuit thereof, and means responsive to the speed of the electro-motor means to limit the speed of said connected motor-and-generator means when its output load is reduced.

5. Electric welding apparatus comprising connected electro-motor and electro-generator means, electric welding means connected with the generator output circuit thereof, and means responsive to the speed of the electro-motor means to introduce an extra resistance into the intake circuit of the electro-motor means and thereby limit the speed of said connected motor-and-generator means when its output load is reduced.

6. Electric welding apparatus comprising connected electro-motor and electro-generator means, electric welding means connected with the generator output circuit thereof, and automatic regulating means responsive to variations in both the input E. M. F. and the speed of the electro-motor means to control the output E. M. F. and speed of the connected motor-and-generator means.

7. Electro welding apparatus comprising motor-generating apparatus, and means responsive to a variation in its input E. M. F. to vary the resistance of the input circuit and thus compensate said input E. M. F. variation, and electric welding means connected with the output circuit of the motor-generating apparatus.

8. Electric welding apparatus comprising an electric welding circuit, motor-generating apparatus having its output circuit connected therewith, and means responsive to progressive variations of input E. M. F. to progressively and compensatively vary the resistance of the input circuit.

9. The combination with a motor generator, of a supply circuit for operating the same, and voltage regulating means comprising a rheostat in said supply circuit, a solenoid in said supply circuit connected across said motor, a mechanism operatively connected to the rheostat and adapted to be moved by the solenoid, said mechanism tending to reduce the resistance of said rheostat to a minimum when uninfluenced by said solenoid.

10. The combination with a motor, of the widely variable load connected thereto, a series of resistances, and means responsive to the potential across the armature of the said motor to insert or cut out said resistances from the motor circuit, said resistances being of substantially uniform value except the last or end one which is of higher resistance than any of the others and is adapted for insertion in the motor circuit during no load operation thereof.

11. The combination with a motor, of a rheostat in the motor circuit, a mechanism responsive to the potential across a portion of the motor circuit for adjusting said rheostat, a switch in said motor circuit, and means responsive to a predetermined position of said rheostat adjusting mechanism for controlling said switch.

12. The combination with a motor, of a rheostat in the motor circuit, a mechanism responsive to the potential across a given portion of the motor circuit for controlling said rheostat, a switch in said motor circuit, and a handle operably connected with said mechanism, rheostat and switch and adapted on movement thereof to control said rheostat and switch.

13. In an arc welding apparatus, the combination with a motor, of a rheostat in the motor circuit, a mechanism responsive to the potential across a given portion of the motor circuit for controlling said rheostat, a switch in said motor circuit operably connected with said mechanism, predetermined movement of said mechanism in one direction being adapted to cut said rheostat out of the motor circuit and open said switch while a predetermined movement of said mechanism in the opposite direction is adapted to increase the resistance of said rheostat in the motor circuit and close said switch.

In testimony whereof, I have affixed my signature to this specification.

ALEXANDER CHURCHWARD.